United States Patent [19]

Rouwhorst et al.

[11] 4,309,223
[45] Jan. 5, 1982

[54] FLUSHING PROCESS FOR PIGMENTS

[75] Inventors: Dale L. Rouwhorst, Holland; Ronald L. Jillson, Midland, both of Mich.

[73] Assignee: BASF Wyandotte Corporation, Wyandotte, Mich.

[21] Appl. No.: 109,357

[22] Filed: Jan. 3, 1980

[51] Int. Cl.³ .......................... C09C 3/10; C09D 17/00
[52] U.S. Cl. .................................. 106/309; 260/34.2; 106/285
[58] Field of Search .............. 106/262, 285, 235, 309; 260/34.2

[56] References Cited

U.S. PATENT DOCUMENTS

| | | | |
|---|---|---|---|
| 2,378,786 | 6/1945 | Osborne | 106/309 |
| 2,637,711 | 6/1950 | Auer | 260/29.2 UA |
| 2,907,670 | 10/1959 | Katz et al. | 106/262 |
| 2,929,733 | 3/1960 | Kebrich et al. | 106/262 |
| 3,437,624 | 4/1969 | Dawn et al. | 260/29.2 |
| 3,526,391 | 9/1970 | Church | 259/4 |
| 3,980,488 | 9/1976 | Barrington et al. | 106/262 |
| 4,227,936 | 10/1980 | Osswald et al. | 106/309 |

OTHER PUBLICATIONS

Mead, "The Encyclopedia of Chemical Process Equipment", pp. 925 & 926.

Primary Examiner—Allan Lieberman
Attorney, Agent, or Firm—Bernhard R. Swick

[57] ABSTRACT

This invention relates to a method for producing a pigment-organic vehicle product which comprises forcing an aqueous pulp of the pigment through a conduit and injecting the vehicle into the conduit and aqueous pulp. The mixture is then homogenized, subjected to further mixing and transferred to a traveling horizontal perforated surface whereby some of the water drains from the mixture through the perforations. The aqueous pulp, organic vehicle mixture is then forced through a cylindrical chamber having defined therein an axial opening of a diameter smaller than that of the chamber, and at least one second opening spaced from the axial opening. The mixture is forced through the chamber and axial opening by a rotating helical surface whereby the product is extruded through the axial opening and water is squeezed from the mixture. The water then exits from the chamber through the second opening.

11 Claims, 1 Drawing Figure

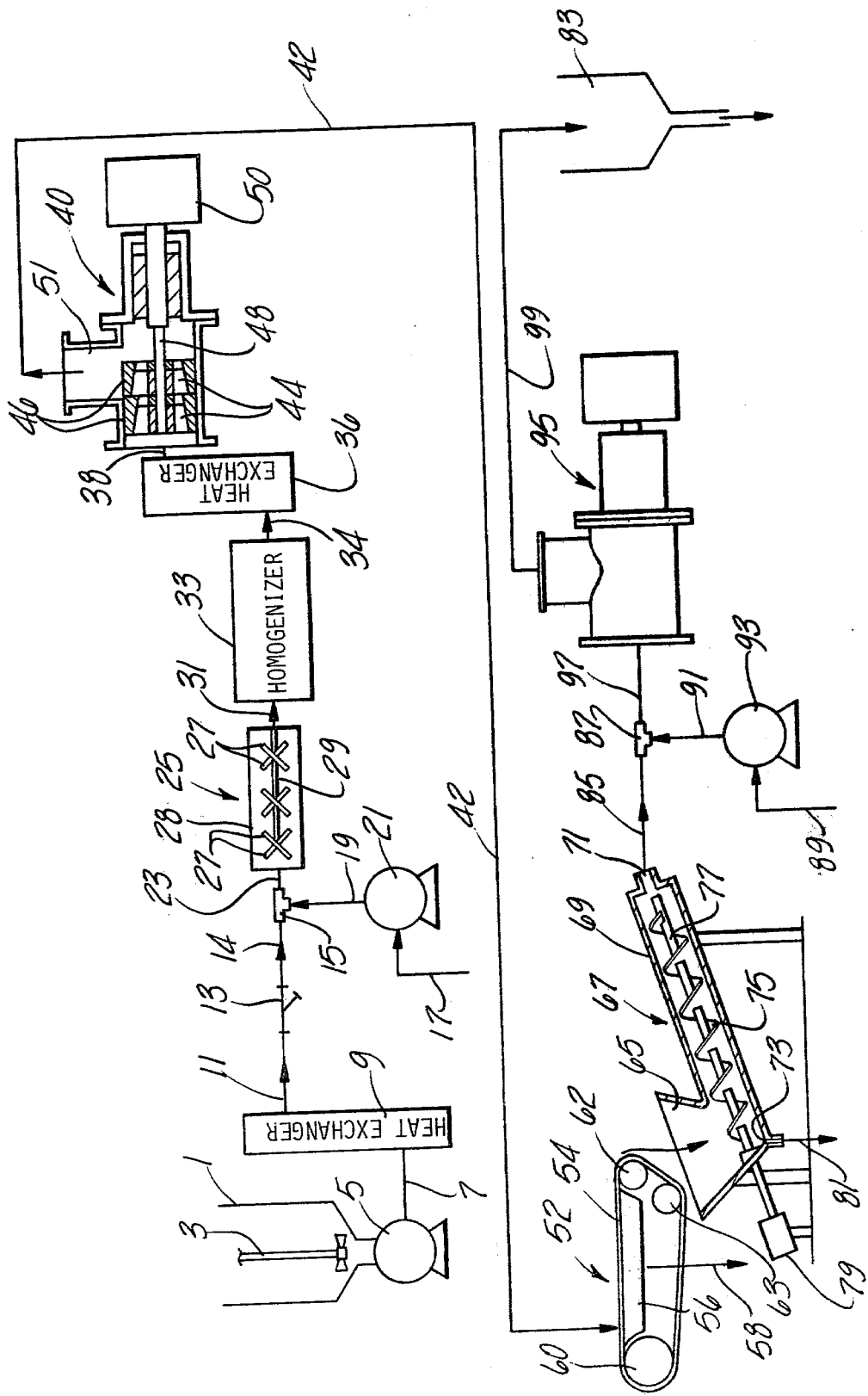

FLUSHING PROCESS FOR PIGMENTS

BACKGROUND OF THE INVENTION

1. Field of the Invention

This invention relates to new and useful improvements in pigment dispersions. It relates particularly to the transfer of a pigment from an aqueous pulp directly into organic vehicles by an operation known to those skilled in the art as flushing.

2. Description of the Prior Art

Historically, organic pigments have been made by coupling in a dilute aqueous slurry, which is then filtered in a filter press to concentrate the pigment. The presscake is either dried to obtain a dry color, or "flushed" to transfer the pigment particles from the aqueous phase to a non-polar oil or resin phase. This assists in keeping pigment particles non-agglomerated and easier to dilute for ultimate use in inks or coatings. Flushing has been carried out for many decades by mixing pigment presscake with suitable types and quantities of "vehicles" which may be an oil, or a solution of resin or resins and other additives in a solvent. In the prior art, the transfer was effected by merely kneading the presscake and vehicle together until substantially all the water has separated. There were generally batch-type operations employing sigma-blade mixers similar to dough mixers or Banbury mixers. Such processes are very energy intensive and labor intensive since the flushers have to be tilted to remove water from time to time as it breaks, i.e., becomes freed of pigment which has transferred to the oil phase. Also, the final paste or dispersion is often extremely viscous and must be removed manually by shoveling and scraping with hoes and other suitable manual tools.

Accordingly, it is a purpose of the instant invention to provide for flushing a pigment which may be carried out continuously and completely automatically.

Statement of Relevant Patents

To the best of applicant's knowledge, the following patents are the ones most relevant to determination of patentability:

| U.S. Pat. No. | Issue Date | Inventor | Assignee |
|---|---|---|---|
| 3,980,488 | 9/14/76 | Barrington et al | Sherwin-Williams |
| 2,378,786 | 6/19/45 | Osborne | Unassigned on Face |
| 2,637,711 | 5/5/53 | Auer | Unassigned on Face |

U.S. Pat. No. 3,980,488—Barrington et al—Discloses flushing an organic pigment from an aqueous slurry or presscake into a hydrophobic organic vehicle in conventional equipment such as a homogenizer followed by separating the water from the flushed mass of pigment and vehicle.

U.S. Pat. No. 2,378,786—Osborne—Discloses mixing a pigment slurry with oil, passing the mixture through a colloid mill which could be considered equivalent to a homogenizer, followed by passing through a heat exchanger and dewatering on a heated belt.

U.S. Pat. No. 2,637,711—Auer—Discloses mixing benzidine yellow and water in a pony mixer until a slurry is formed. The slurry is then homomixed for 30 minutes and colloid milled to complete the pigment deflocculation. It is suggested in the patent that a Gaulin homogenizer be employed for dispersion.

As can be seen from a review of the above patents, there is no disclosure in any of them of the use of a screw extruder-type apparatus for the removal of water from a flushed pigment.

SUMMARY OF THE INVENTION

This invention relates to a method for producing a pigment-organic vehicle product which comprises forcing a pigment-containing aqueous pulp-organic vehicle mixture through a cylindrical chamber having defined at one end thereof at least one axial opening preferably of a diameter smaller than that of the chamber, and at least one second opening spaced from said axial opening. The mixture is forced through the chamber and axial opening by a rotating helical surface whereby the product is extruded through the axial opening and water is squeezed from the mixture. The water then exits from the chamber through the second opening.

In a preferred embodiment of this invention, the aqueous pulp-organic vehicle mixture is prepared by forcing the aqueous pulp through a conduit and injecting the vehicle into the conduit and aqueous pulp. The mixture is then homogenized, subjected to further mixing where necessary or desirable, and transferred to a traveling horizontal perforated surface whereby some of the water drains from the mixture through the perforations. This effectively removes that water which is most easily removed, thus reducing the amount of water which must be removed in the cylindrical chamber apparatus. Temperature control is maintained throughout the process through the use of conventional heat exchangers. The product is then standardized in a conventional container such as a tank by adding the correct amount of additional vehicle to obtain the desired proportion of pigment and vehicle. In order to reduce the amount of vehicle to be added batch-wise in the standardization tank or container, a pre-determined amount of vehicle is added to the product by injection after it exits from the axial opening of the chamber. This may then be mixed by a suitable mixer prior to transfer to the standardization tank.

DESCRIPTION OF THE DRAWING

The accompanying drawing is a schematic flow diagram illustrating a typical process and apparatus employed therein for producing a pigment-organic vehicle product, particularly by a continuous process. The drawing is not to scale since some of the apparatus is greatly enlarged to show structure.

Only the preferred embodiment of the invention is shown in the drawing, and accordingly, it should be understood that various changes or modifications may be made therein without departing from the spirit and scope of the appended claims.

DESCRIPTION OF THE PREFERRED EMBODIMENT

The instant invention provides a novel and unobvious process for dispersion of a pigment such as a diarylide yellow pigment in a hydrophobic organic vehicle. An aqueous pigment slurry is thoroughly mixed with the organic vehicle and homogenized whereby the organic pigment is transferred from the aqueous slurry to the organic vehicle and a major portion of the water present in the slurry separates. The water is then removed from the pigment-organic vehicle mixture by a squeezing action to leave the pigment-organic vehicle product. While the method of this invention is particularly useful with diarrylide yellow pigments, the invention is also applicable to other organic pigments such as Phthalocyanine blue, Red Lake C and sodium lithol.

With reference now more particularly to the drawing, the aqueous pulp of the pigment is stirred in a suitable container known as a strike tank 1 which is provided with an agitator 3. The aqueous pulp is preferably an aqueous unfiltered slurry containing, by weight, about 0.5 percent to 10 percent pigment. In some instances a presscake may be employed. The aqueous pulp is then pumped by means of pump 5 through a conduit 7 at a pressure of about 15 to 50 psig. The pulp then flows through a shell and tube-type heat exchanger 9 wherein the aqueous pulp is heated by means of steam to a temperature from ambient to about 160° F. The aqueous pulp flows from the heat exchanger 9 through conduit 11, a Y strainer 13, conduit 14 and an injection means 15, which may be a simple Tee. The Y strainer is a conventional pipeline strainer. This type of device is described in the *Encyclopedia of Chemical Process Equipment*, edited by William J. Mead, copyright 1964, Reinhold Publishing Corporation, New York, pages 925 and 926 which is incorporated herein by reference. The vehicle is pumped from a source (not shown) through conduits 17 and 19 into injection means 15 by a pump 21.

The proportion of pigment to vehicle will have a very wide range depending upon the concentration of pigment in the vehicle that is desired in the ultimate product. The proportion of pigment to vehicle in the mixture leaving the injection means 15 may range from a very small percentage of pigment to a very high percentage of pigment. Generally, the ratio of pigment to vehicle is by weight about 0.3:1 to 1:1. A preferred range is about 0.4:1 to 0.7:1.

Any of the hydrophobic organic vehicles that are commonly used in printing ink and coating compositions may be employed in the method and composition of this invention. Such vehicles are represented by drying, semi-drying, and non-drying oils, litho varnishes, mineral oils, rosins, dimerized rosins, esters of dimerized rosins, aliphatic and aromatic hydrocarbon resins, alkyl-aromatic resins, maleic and fumeric-modified rosin, phenolic resin, phenolic-modified rosin esters, alkyd resins, urethane-modified alkyds, polyolefins, polyindenes, coumarone/indene resins, phthalate esters, castor oil, fish oil, linseed oil, gloss varnishes, and various heat-set, quick-set and steam-set vehicle systems. A preferred vehicle is mineral oil.

The oil and aqueous pulp flow from the injection means 15 through a conduit 23 into a static mixer indicated generally at 25. This is a device that is easily installed in new and existing pipelines. It consists of a series of semi-elliptical plates 27 which are positioned in a tubular housing 28 which may be simply the pipe or conduit. The single element consists of two plates 27 generally perpendicular to each other and the mixing operation is based on splitting and then diverting the input streams. In the mixing process, the elements enhance the random dispersion of substreams so that a device with six elements is sufficient for most low-viscosity mixing requirements. The mixing elements 27 may be welded to a rod 29 affixed to the housing 28 or even directly to the housing if it is not necessary to remove them. A suitable mixer of this type is sold by the Ross Company under the designation LPD motionless mixer. This is shown and described on page 811 of the 1976 *Chemical Engineering Catalog*, published by the Reinhold Publishing Corp., New York, N.Y., which is incorporated herein by reference.

The aqueous pulp-vehicle mixture flows from the static mixer 25 through conduit 31 to a homogenizer 33. This is a device well known to those skilled in the art, two examples of which are shown in FIGS. 1–3 of U.S. Pat. No. 3,437,624 and described in columns 8 through 11 thereof. Another type of homogenizer is shown and described in U.S. Pat. No. 3,526,391. The homogenizer description of these two references are incorporated herein by reference. Most preferred is a device of the type shown in FIG. 3 in the '624 patent which is manufactured by the Manton-Gaulin Manufacturing Company, Inc., of Everett, Massachusets, sold under the designation F-M-D. The Gaulin homogenizer includes a pumping means which raises the pressure of the aqueous pulp-organic vehicle mix from about 1000 to 8000 psig before passing through the valve mechanism shown in FIG. 3 of, as described in, U.S. Pat. No. 3,437,624. Applicant has found Manton-Gaulin model 150-KLG-8RA to be suitable.

The homogenized aqueous pulp-vehicle mixture flows from the homogenizer 33 through conduit 34, a conventional heat exchanger 36, such as a jacketed pipe heat exchanger to maintain the mixture at a temperature from ambient to about 160° F. using steam or tap water as needed, conduit 38 and a pipeline mixer, indicated generally at 40. The pipeline mixer 40 is a tandem shear pipeline mixer which consists of two turbines 44 and two stators 46. The turbines are mounted on a single shaft 48, which is in line with the inlet to the pipeline mixer 40. Shaft 48 is driven by a conventional prime mover such as an engine or electric motor 50. The outlet 51 from the pipeline mixer is at right angles to the inlet and to the shaft 48.

These mixing operations, in particular the homogenization, accomplish the dispersion of the organic pigment in the organic vehicle or, in other words, the transfer of the organic pigment from the aqueous pulp to the organic vehicle. However, the water is still present, and accordingly, the overall mixture, flows through conduit 42 onto a dewatering belt or traveling belt filter indicated generally at 52. This apparatus comprises a continuous or endless belt 54 of suitable perforated material whereby that water, which may be easily removed, flows by gravity from pigment-organic vehicle through the perforations (not shown) in the belt 54 into a suitable collecting means such as a pan 56. Water then flows out of the pan 56 through a suitable conduit 58 for disposal. The belt is driven by suitable drive means (not shown) connected to a roller 60 whereby the belt travels around said roller 60, passing over said pan 56 and then around two additional rollers 62 and 63, returning then to roller 60.

The pigment-organic vehicle-water mixture is deposited on one end of the traveling belt 54 which moves to the right as shown in the drawing with the water draining off into the pan 56 as it moves.

The remaining pigment-vehicle-water mix, which contains about 45 to 75 percent by weight water, falls off the end of the traveling belt 54 as it goes around roller 62 and into the hopper 65 of a screw-type extrusion device indicated generally at 67. This device comprises a cylindrical chamber 69 of any suitable material such as steel, having defined therein an axial opening 71 of a diameter smaller than that of the cylindrical chamber 69. Said chamber also has a second opening 73 spaced from said axial opening. In some instances, it may be desirable to have a plurality of second openings 73 spaced preferably along the bottom of chamber 69. The apparatus is provided with a helical screw means 75 forming a helical surface mounted on a shaft 77 which shaft is rotated by a suitable prime mover 79 such as an electric motor or an engine.

The pigment-vehicle-water mixture entering through the hopper 65 is forced by the helical surface of the screw 75 through said chamber 69 whereby the pigment-vehicle product is forced through the axial opening 71 and water is squeezed from the mixture due to the restrictive action of opening 71, and/or the shearing action of the rotating helical surfaces. The water, which is squeezed out, then moves by gravity to the opening 73 where it drains through conduit 81 for disposal. While a horizontal extrusion device would be operable, such device would generally require more than one opening 73 for the water to drain out. It is preferred that the extrusion device 67 be tilted at an angle, preferably from about 5 to 30 degrees to the horizontal, whereby the axial opening 71 is at a higher elevation than the second opening 73. Thus, the water squeezed from said mixture will flow down the lower inner surface of said chamber 69 to said opening 73 for draining. In any case, vacuum may be applied to the second opening or openings to facilitate water removal.

Generally speaking, the pigment-organic vehicle product must meet certain pigment to vehicle ratio specifications. A desirable product contains about 5 to 50 percent by weight pigment. Accordingly, additional vehicle is added to the paste in a suitable container or tank 83 until the desired proportion is achieved. In order to minimize the amount of vehicle which must be added directly into tank 83 by what would amount to a batch-type addition, it has been found useful to transfer the paste through a suitable conduit 85 and injection device 87 similar to injection device 15. As with injection device 15, additional vehicle is added which is provided from a source (not shown) through conduits 89 and 91 by means of a suitable pump 93.

For convenience in mixing the vehicle with the product, a suitable pipeline mixer, generally indicated at 95, of substantially the same design as pipeline mixer 40, is provided. The pigment-organic vehicle mixture flows through conduit 97, mixer 95 and conduit 99 into tank 83. Due to the addition of vehicle through injection device 87, only a small amount of additional vehicle is needed for addition in tank 83 to bring the product up to specification.

From the foregoing, it will be appreciated that the instant invention has many advantages, among which are simplicity of operation, savings of time and labor, and the provision of a continuous process and resulting high production rate.

The embodiments of the invention in which an exclusive privilege or property is claimed are defined as follows:

1. A method of producing a pigment-hydrophobic organic vehicle product which comprises forcing an aqueous pigment-containing pulp-hydrophobic organic vehicle mixture having a proportion of pigment to vehicle up to about 1:1 through a cylindrical chamber having defined at one end thereof an axial opening of a diameter smaller than that of said chamber, and at least one second opening spaced from said axial opening, said mixture being forced through said chamber and said axial opening by a rotating helical surface whereby said product is forced through said axial opening, water is squeezed from said mixture and exits through said second opening.

2. The method of claim 1 wherein the axis of said cylindrical chamber is at an angle to the horizontal with the axial opening at a higher elevation than said second opening whereby the water squeezed from said mixture flows to and through said second opening by gravity.

3. The method of claim 2 wherein said angle to the horizontal is from about 5 to 30 degrees.

4. The method of claim 1 wherein a portion of the water is removed from said aqueous pulp-organic vehicle mixture prior to entering said cylindrical chamber by supporting said mixture on a traveling horizontal perforated surface whereby said portion of the water drains from said mixture through said perforations.

5. The method of claim 4 wherein said aqueous pulp-organic vehicle mixture is prepared by forcing said aqueous pulp through a conduit, injecting said vehicle into said conduit and said aqueous pulp, homogenizing said mixture and transferring said homogenized mixture to said traveling surface.

6. The method of claim 5 wherein subsequent to the injection of the vehicle into said aqueous pulp, the two components are subjected to static mixing prior to homogenization.

7. The method of claim 6 wherein said aqueous pulp is heated to a temperature from ambient to about 160° F. by contact with a heat exchange surface prior to the injection of said vehicle, and said homogenized mixture is maintained at a temperature from ambient to about 160° F. by contact with a heat exchange surface followed by further mixing prior to transfer to said traveling surface.

8. The method of claim 7 wherein said product from said axial opening is passed through a conduit wherein further hydroxhobic organic vehicle is injected followed by further mixing.

9. The method of claim 7 wherein said homogenization is conducted at a pressure from about 1000 to 8000 psig.

10. The method of claim 9 wherein said pigment is diarylide yellow and the aqueous pulp prior to mixing with said vehicle contains 0.5 to 10.0 percent by weight of said pigment.

11. The method of claim 10 wherein said vehicle is mineral oil.

* * * * *